United States Patent Office 3,173,258
Patented Mar. 16, 1965

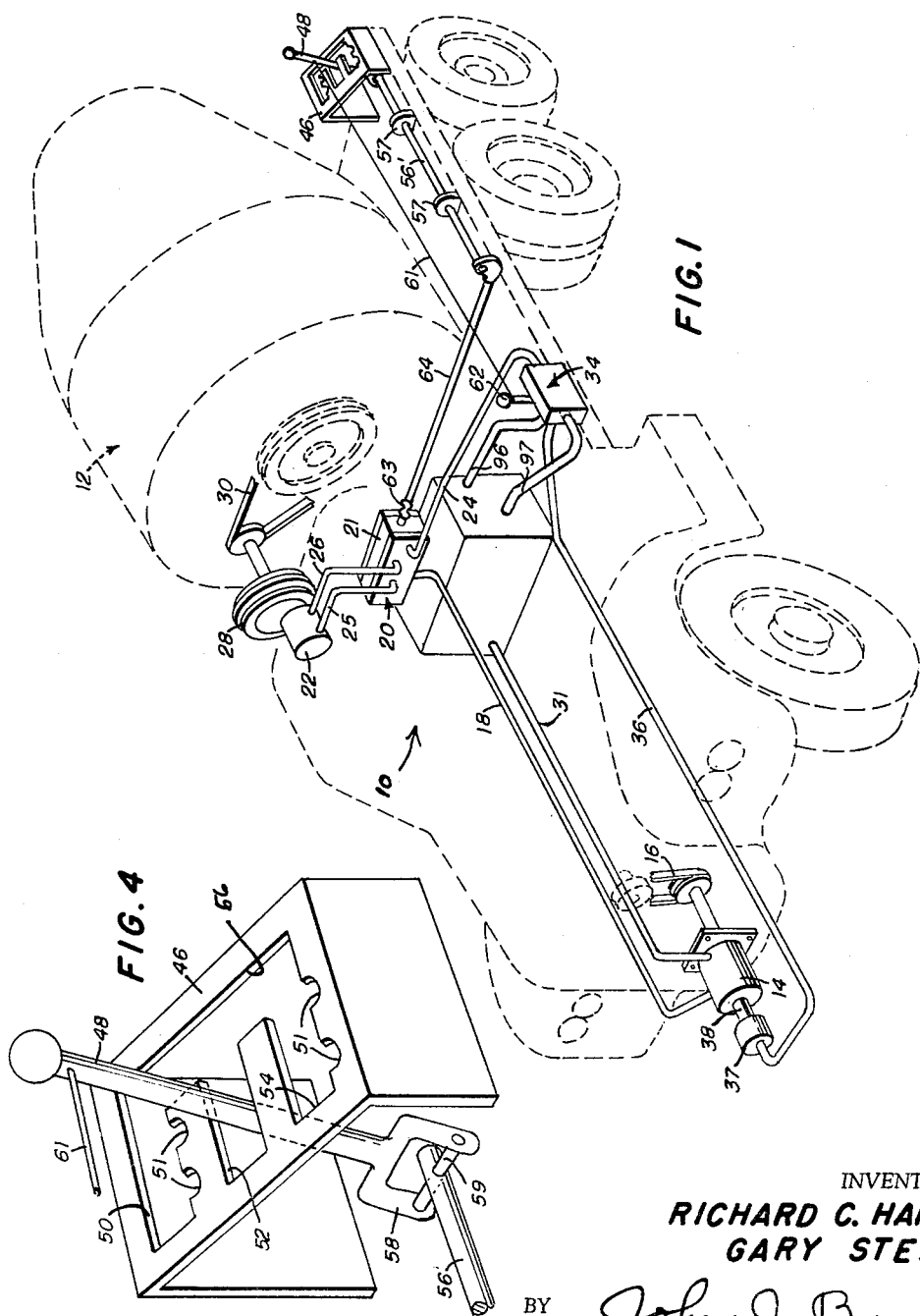

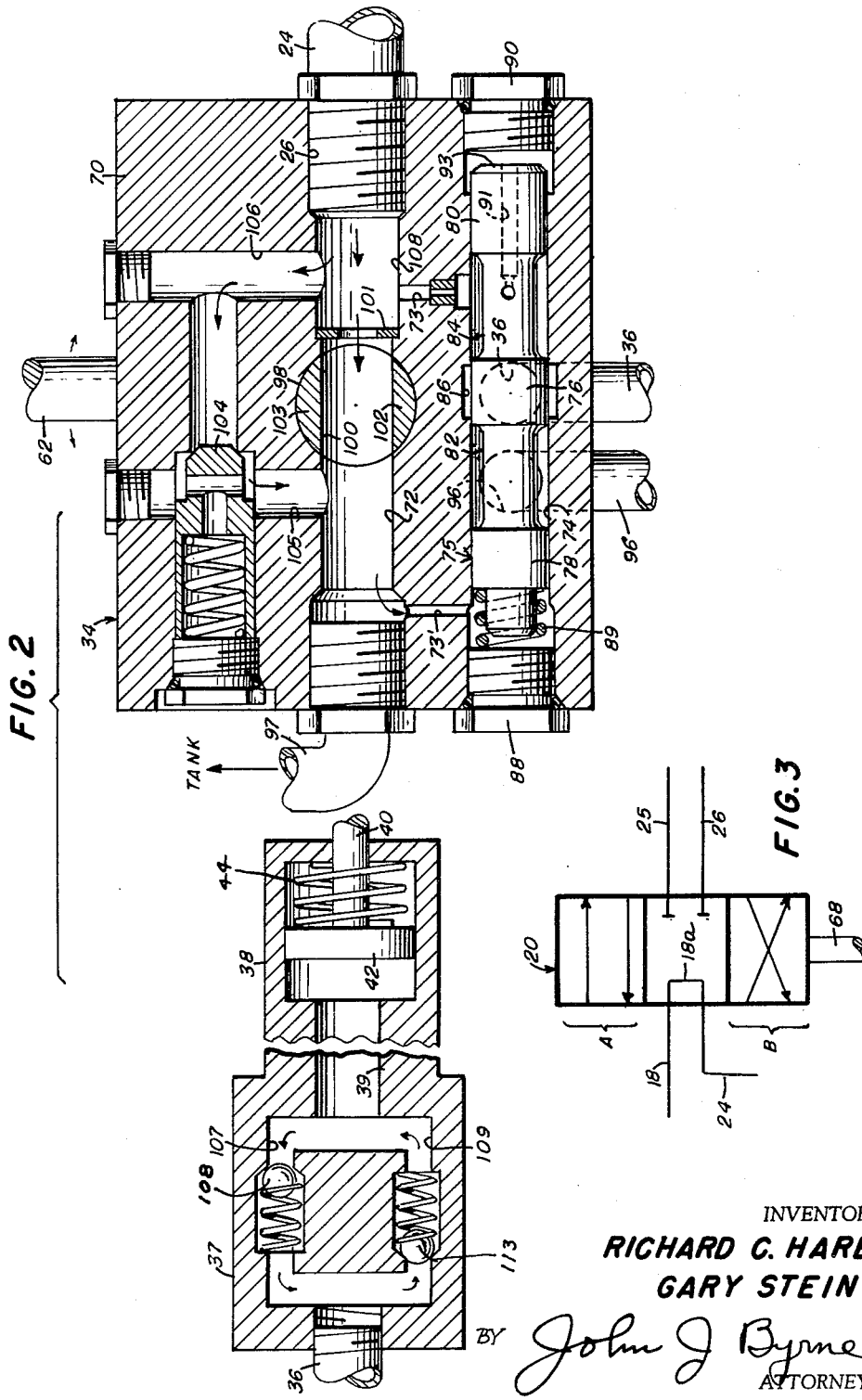

3,173,258
CONTROL SYSTEM FOR HYDROSTATIC
TRANSMISSION CIRCUITS
Richard C. Hare, Wauwatosa, and Gary Stein, New Berlin, Wis., assignors to Applied Power Industries, Inc., Milwaukee, Wis., a corporation of Wisconsin
Filed Oct. 17, 1962, Ser. No. 231,104
7 Claims. (Cl. 60—53)

This invention relates to a control system for a hydrostatic transmission circuit having constant speed output.

In environments such as drive means for a mixing drum on a transit concrete mixing vehicle, it is desirable to have a power transmission system capable of driving the drum at different selected speeds and having the additional capability of maintaining that particular speed once set, even though the drive speed of the vehicle engine is changing.

Due to the high inertia developed by rotating concrete mixing drums, it is essential that its direction of rotation only be reversed when operated at a very slow speed. Therefore, another objective of this invention is to provide a hydro-mechanical control for a fluid transmission which is not subject to directional changes while the drum is rotating at a rapid rate.

A more specific objective of this invention is to provide a single operator control handle which performs the dual function of controlling speed and direction with positive lock means to prevent load directional change to take effect, except at minimum speeds.

A further objective of this invention is to provide a simplified hydrostatic transmission control system which has a novel flow control compensator assembly for varying fluid output from the pump to maintain flow as selected by the operator.

A still further objective of this invention is to provide a novel response controller for dampening and isolating sporatic pulses in the control conduits without appreciably delaying a correction response in the control system. The response controller facet of the invention has as one of its objectives the ability to prevent a stall of the prime mover engine during instances of heavy power requirements, such as those encountered during stop and go driving.

Another objective of the invention is to provide a control system with a quick response capability which is not materially influenced by variations in the viscosity of the transmission fluid.

As a further objective, the invention provides a pressure control sensing means on the low pressure side of the load which will compensate for leaks in the fluid circuitry.

These and other objectives and advantages of the invention will be more fully understood upon a reading of the following specifications taken in view of the attached drawings wherein:

FIGURE 1 is a partially diagrammatic, partially schematic view showing several elements in perspective as they are located on a transit mixer vehicle;

FIGURE 2 is a cross-sectional view of the volume control, the speed control valve, and the response controller mechanism;

FIGURE 3 is an enlarged schematic of a directional control valve; and

FIGURE 4 is an enlargement of the control handle assembly disclosed in FIGURE 1.

Referring now in particular to the drawings wherein like elements are indicated by like numerals, the figure 10 indicates the hydrostatic transmission system and controls for a rotatable mixing drum 12. In general, the system comprises a pump, a motor, a manual control, a directional valve, a speed compensator effective on pump delivery, and a flow responsive controller effective to isolate sporadic pulses from the pump. The system is powered by a variable volume pump 14 which may be of the type disclosed in the Stewart Patent Number 2,997,956, issued on August 29, 1961. The pump is driven by a take-off 16 of the prime mover engine. The pump delivers its fluid energy via a conduit 18.

Conduit 18 leads to a directional control valve 20, the schematic of which is shown in FIGURE 3. As seen in FIGURE 3, the valve is in neutral and the fluid flows from line 18 directly to a conduit 24. When the valve is positioned to bring either sections A or B into position opposite line 18, the passageway 18a is interrupted and the direct communication between conduits 18 and 24 (provided by passageway 18a) no longer exists. A hydrostatic motor 22 receives fluid under pressure from the directional valve by way of lead and return conduits 25 and 26. In any convenient fashion, power from motor 22 is delivered to a mechanical gearing system indicated by the numeral 28 and power thereafter is mechanically transferred to a mixing drum 12 via a chain or the like 30. The intake side of pump 14 is connected to a tank via a conduit 31.

The conduit 24 is connected from directional valve 20 to the interior of a speed control apparatus 34. The speed control apparatus receives a second conduit 36 leading to a response controller 37 and thence to a pressure operated variable volume control 38 for pump 14 via a passageway 39. As can be determined by a reading of the above-identified patent, the output of such a pump is varied by transmitting a lineal motion thereto by way of a rod or the like 40.

The rod 40, shown in FIGURE 2, depends from a piston head 42 reciprocally received within the volume control. Placed within the rod end of the control is a compresion spring 44 which normally urges piston 42 away from pump 14. As will be understood by those skilled in the art, as pressure is increased in the head end of control 38, piston 42 will urge rod 40 into pump 14 causing a smaller amount of fluid to be delivered to conduit 18.

Prior to describing the inner workings of the components mentioned thus far, it is advisable to understand the location and operation of the manual controls provided as a part of the invention.

Fixedly secured to the vehicle body, near the mixing drum, is a control plate 46 having an E-slot configuration therein. An operating handle 48 is operably received in the slot and is movable to each of three slots 50, 52, and 54 as it traverses a common base slot 56. In the embodiment shown, slot 50 may be a discharge slot, slot 52 a neutral slot, and slot 54 a mixing slot.

As is known to the art, a concrete mixing drum rotates in one direction while the concrete is charged, mixed, and agitated, and in the opposite direction during discharge. A movement of handle 48 along base slot 56 is effective on direction of rotation, and as will be made more apparent below, a forward or backward movement in slots 50, 52, and 54 is effective on speed of rotation. The slots can be notched at 51 to insure that when the operator removes his hand from the lever, the handle will remain stationary. Under ordinary cirmumstances, friction alone will maintain the handle in its set position.

The operating lever 48 is pivotally mounted to a shaft 56' by a universal joint 58 and a pin 59. The pin 59 extends through the shaft 56' such that a movement of lever 48 along base slot 56 causes a rotation in shaft 56' about its longitudinal axis. A plurality of journals 57 rotatably secures the shaft to the vehicle frame and prevents any longitudinal movement therein. The universal 58 permits lever 48 to pivot through slots 50, 52, and 54.

Intermediate the length of the operator's handle there is secured a heavy duty wire or Bowden cable 61. At its other end, the cable is connected to the control lever 62 of speed control apparatus 34. Of course, any mechanical, hydraulic, or electrical connection between levers 62 and 48, which will transmit a relative movement in lever 62, in response to a like movement in lever 48, is suitable. Biasing means are provided for lever 48, in both directions, in order that constant tension is maintained in cable 61.

A linkage rod 64 is fixedly secured to the outer end of rod 56' and is pivotally secured at 63 to the slide control member or directional control valve 20. The linkage rod is shaped as a bell crank, and thus converts the rotary movement of shaft 56 to a lineal movement in the slide member. Therefore, as diagrammatically disclosed, in FIGURE 1, any movement of lever 48 along base slot 56 causes a rotary movement in rod 56', and a consequent sliding movement in the slide plate 21 of valve 20. This movement determines the direction of rotation of mixing drum 12 as sections A and B are selectively positioned opposite conduits 18 and 24.

Valve 20 is of a four-way, three position type having an open center. For every position of the valve 20, the fluid output is diverted to control assembly 34. The fluid communication between conduit 18 and conduit 24 is maintained in each of the three positions notwithstanding the position of lever 48 with respect to base slot 56. The flow line 24, therefore, continuously and accurately presents the pressure developed in conduit 18 to the speed control mechanism 34.

The speed control mechanism 34 is shown in detail in FIGURE 2. Basically, the mechanism is responsive to pressure differentials and operates because of a restrictive orifice along a path of fluid flow. The valve is comprised of a valve housing 70 having a pair of longitudinal passageways 72 and 74 therethrough and in communication with each other via the orifices 73 and 73'. Reciprocally received within passageway 74 is a spool 75 having a center land 76 and two end lands 78 and 80. Between the lands there is formed a pair of annular grooves 82 and 84. Passageway 74 has an annular recess 86, intermediate its ends, which is covered by land 76 in one position of the spool.

The ends of passageway 74 are plugged by conventional cap screw members 88 and 90. A compression spring 89 is received between plug 88 and land 78 and with the pressure communicated via orifice 73' normally maintains the spool toward plug member 90. When the spool abuts plug 90, annular groove 86 is connected to passageway 74 via groove 82. A bore 91 communicates groove 84 to the spool end 93. The area at end 93 receives a slightly higher pressure than the spring 89 end due to pressure differential through orifices 101 and 103. Spring 89 biases the spool such that conduit 96 is valved to conduit 36 when small or no pressure differential exists through orifices 103 and 101.

A pair of conduits 36 and 96 are in fluid communication with passageway 74. Conduit 96 enters the passageway at groove 86, and conduit 36 enters at a point between the groove and plug member 88.

Passageway 72 is connected at one end to conduit 24 and at its other end to tank via conduit 97. Intermediate the length of passageway 72 is a cylindrical valve member 98 having a transverse bore 100 therethrough. Spaced between conduit 24 and the valve member 98 is the maximum flow constant orifice washer 101. Transverse bore 100 can be either aligned with passageway 72 (as shown) or positioned to diminish the cross-section of passageway 72 by segments 102 and 103. The member 98 extends to a point without the housing 70 and is operatively connected to the lever 62. Therefore, referring back to FIGURE 1, it can be seen that a movement of handle 48 along the slots 50, 52, and 54 varies the opening through passageway 72 by controlling the attitude of valve member 98.

A safety relief valve 104 is placed in communication with passageway 72 via by-pass conduits 105 and 106 on either side of valve 98. In the event the variable orifice is closed, valve 104 will unseat and prevent dangerous pressure build-up.

As positioned in FIGURE 2, passageway 72 is unrestricted by valve member 98 and free fluid flow is permitted between conduit 24 and tank. However, as handle 62 is rotated, the size of passageway 72 is reduced and a back pressure is developed to the right of valve 98. This back pressure is transmitted to surface 93 via orifice 73 and bore 91 which causes the spool 75 to shift to the left against the bias of spring 89. The travel of spool 75 to the left communicates conduit 36 to the developed pressure via groove 86, sending fluid through housing 37 to cylinder 38, and thus causing a lineal movement in rod 40. Such a movement develops less fluid output in line 18 by the variable flow pump 14.

In operation lever 48 is first moved along slot 56 to a point adjacent a selected drum rotation slot. The slide plate 21 is thus positioned to route fluid from pump 14 in a selected direction to motor 22. The greatest speed of rotation is then selected by moving handle 48 forwardly to the position shown in FIGURE 2 which varies the pressure differential across valve 98. When in any position other than that shown in FIGURE 2, passageway 72 is restricted a selected amount by member 98 and a particular back-pressure is developed in cross bore 73. Spool 75 is caused to shift to the left permitting pressurized fluid in conduit 36 to move rod 40 inwardly toward the center of the pump. As a result, pump 14 decreases its output and therefore causes a smaller pressure differential across the variable orifice 103. This decreased pressure differential allows the spool to move to the right because of less pressure at end 93. The spool moves to the right until pressure in groove 84 is isolated from groove 86 by land 76. At this time the flow from pump 14 will stabilize and the spool will make minor corrections as influenced by pressure differential fluctuations across the orifices 103 and 101. When handle 48 is in slot 56, the valve 98 restricts the passageway 72 its greatest amount.

In the event a pressure drop develops in the system, springs 44 and 89 will overcome the force against surface 93, spool 75 will move to the right, and conduit 36 will be communicated to tank via conduit 96. This permits rod 40 to move to the left (away from pump 14), thus increasing the output of pump 14. As pressure drop increases across orifices 101 and 103 the pressure force against end 93 will overcome spring 89 and will move spool 75 to the left until conduit 36 is isolated from conduit 96. As pressure on end 93 keeps increasing conduit 36 will be connected to pump output until a balance is reached.

Since systems of this type are driven by the engine of the prime mover, other power requirements are supplied concurrently with the power for the constant system. This can sometimes result in unreliable irregular power pulsations. For example, if drum 12 is being rotated and the vehicle is caused to move from a standing position, a power loss is reflected in the hydraulic system. This type of sporatic pulsation, and others of a similar nature, do not accurately reflect the need for an adjusted speed setting. In order to render such unwanted pulsations ineffective, the response controller 37 is interposed between the speed control 34 and the pump 14. The controller consists of a housing having an input branch 109 and an outgoing branch 107. A one-way check valve 113 of slight resistance is placed within input branch 109 and a oneway check valve 108 of greater resistance is placed in the outgoing branch 107.

This response controller permits relatively free flow of fluid through the check valve 108 and a relatively restricted flow through check valve 113. In this manner signals are quickly transmitted to control 38, but are dampened or dissipated by check valve 113, if they are of short duration. Signals of a proper duration, of course, will still be effective on control 34. The response characteristics of the sytsem are made much more reliable through the use of such an inexpensive and durable apparatus. Since the flow in branch lines 107 and 109 works almost in unison, their proportionate relationship with each is largely insensitive to viscosity variations and changes in the fluid.

In a general manner, while there has been disclosed an effective and efficient embodiment of the invention, it should be well understood that the invention is not limited to such an embodiment, as there might be changes made in the arrangement, disposition, and form of the parts without departing from the principle of the present invention as comprehended within the scope of the accompanying claims.

We claim:

1. In a hydraulic system for controlling fluid flow from a pump having a variable output to a motor, a valve in said system between said pump and said motor for changing the direction of fluid flow to and from said motor, a speed compensator for varying the fluid output from said pump, a device responsive to fluid flow therethrough between said motor and said compensator, said device including a passageway for delivering fluid from said motor to a reservoir, means causing a pressure drop in said passageway, and second means responsive to said pressure drop for operating said compensator.

2. In a hydraulic system for controlling fluid flow from a pump having a variable output to a motor, a valve in said system between said pump and said motor for changing the direction of fluid flow to and from said motor, a speed compensator effective to vary the fluid output from said pump, a device responsive to fluid flow therethrough between said motor and said compensator, said device including a passageway for delivering fluid from said motor to a reservoir, manually operated means for causing a selected pressure drop in said passageway, and second means responsive to said pressure drop and in communication with said compensator for maintaining the output from said pump at a level having a fixed relationship to said pressure drop.

3. In a hydraulic system for controlling fluid flow from a pump having a variable output to a motor, a directional valve in said system between said pump and said motor for changing the direction of fluid flow to and from said motor, a speed compensator for varying the fluid output from said pump, a device responsive to said fluid flow therethrough between said motor and said compensator, said device including a passageway for delivering fluid from said motor to a reservoir, single manually operated means for operating said valve and causing a selected pressure drop in said passageway, and second means responsive to said pressure drop for operating said compensator.

4. A hydraulic system for controlling fluid flow from a pump to a motor comprising a valve in said system between said pump and siad motor for changing the direction of fluid flow to and from said motor, a speed compensator for varying the fluid output from said pump, a flow responsive device between said motor and said compensator, said device including a passageway for delivering fluid from said motor to a reservoir, manually operated means for producing a selected pressure drop across said passageway, second means responsive to pressure variations in said system and effective to cause said compensator to maintain the output from said pump at a level having a fixed relationship with said pressure drop, and third means between said device and said compensator for dampening sporadic pressure variations in said system from said compensator.

5. A hydrostatic system for driving a transit mixer drum comprising a pump having a variable output, a fluid motor for rotating said drum, connecting fluid circuitry between said pump and said motor, a fluid slide plate directional valve across said circuitry between said pump and said motor for selectively choosing the direction of rotation for said drum, a compensator for varying the output from said pump, a flow responsive device receiving fluid from said motor, said device including means to select a particular pressure drop thereacross and second means responsive to said pressure drop for positioning said compensator, and a manually operated lever for selecting the direction of flow to said motor only when said pressure drop is at a maximum.

6. A hydrostatic system for driving a transit mixer drum comprising a pump having a variable output, a fluid motor for rotating said drum, connecting fluid circuitry between said pump and said motor, a slide plate directional valve across said circuitry between said pump and said motor for selectively choosing the direction of rotation for said drum, a compensator for varying the output from said pump, a flow responsive device receiving fluid from said motor, said device including a rotary valve for selecting a particular pressure drop thereacross and means responsive to said pressure drop for automatically positioning said compensator, and a manually operated lever for transmitting a first lineal motion to said directional valve for selecting the direction of rotation of said drum and a rotary motion to said rotary valve for selecting a particular pressure drop, and second means preventing said lineal motion unless said pressure drop is at a maximum.

7. The system described in claim 6 wherein said second means is comprised of a plate having a continuous opening including a plurality of substantially parallel speed slots and a base slot substantially normal to said parallel slots, and said lever is movable within said opening and is prevented from moving from one of said parallel slots to another unless said base slot is traversed.

References Cited in the file of this patent
UNITED STATES PATENTS

| | | |
|---|---|---|
| 1,982,711 | Vickers | Dec. 4, 1934 |
| 2,102,865 | Vickers | Dec. 21, 1937 |
| 2,789,542 | Vander Kaay | Apr. 23, 1957 |